United States Patent [19]

Laurent et al.

[11] 4,406,823

[45] * Sep. 27, 1983

[54] METHOD OF MAKING ZEOLITES

[75] Inventors: Sebastian M. Laurent, Greenwell Springs; Robert N. Sanders, Baton Rouge, both of La.

[73] Assignee: Ethyl Corporation, Richmond, Va.

[*] Notice: The portion of the term of this patent subsequent to Sep. 27, 2000 has been disclaimed.

[21] Appl. No.: 308,450

[22] Filed: Oct. 5, 1981

[51] Int. Cl.³ .......................... B01J 20/18; B01J 29/06
[52] U.S. Cl. .............................. 252/455 Z; 423/328; 423/329
[58] Field of Search .................. 252/455 Z; 423/328, 423/329

[56] References Cited

U.S. PATENT DOCUMENTS

| | | | |
|---|---|---|---|
| 3,374,058 | 3/1968 | McDaniel et al. | 423/328 X |
| 4,058,586 | 11/1977 | Chi et al. | 252/455 Z |
| 4,150,100 | 4/1979 | Kettinger et al. | 423/329 |
| 4,166,099 | 8/1979 | McDaniel et al. | 423/329 |
| 4,235,856 | 11/1980 | Kostinko | 423/329 |

*Primary Examiner*—Carl F. Dees
*Attorney, Agent, or Firm*—Donald L. Johnson; John F. Sieberth; Paul H. Leonard

[57] ABSTRACT

A method of simultaneously producing or co-synthesizing a combination of zeolite X and zeolite A by separately preparing a sodium aluminate solution and a sodium silicate solution and reacting the solutions in the presence of a small amount of zeolite X seed under controlled conditions of temperature and time to form a product which is a combination of zeolite X and zeolite A.

24 Claims, No Drawings

METHOD OF MAKING ZEOLITES

BACKGROUND OF THE INVENTION

1. Field of the Invention

In general, the present invention relates to the production of zeolites.

2. Description of the Prior Art

Certain naturally occurring hydrated metal aluminum silicates are called zeolites. The synthetic zeolites of the invention have compositions similar to some of the natural zeolites. The most common of these zeolites are sodium zeolites.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula, $Al/Na=1$. The spaces between the tetrahedra are occupied by water molecules prior to dehydration.

Zeolites may be activated by heating to effect the loss of the water of hydration. The dehydration results in crystals interlaced with channels of molecular dimensions that offer very high surface areas for the adsorption of foreign molecules. The interstitial channels of zeolite X are of a size such that heptacosafluorotributylamine and larger molecules will not enter into the channels. The interstitial channels of zeolite A will not accept molecules larger than 5.5 Å.

Zeolites A and X may be distinguished from other zeolites and silicates on the basis of their x-ray powder diffraction patterns and certain physical characteristics. The x-ray patterns for several of these zeolites are described below. The composition and density are among the characteristics which have been found to be important in identifying these zeolites.

The basic formula for all crystalline sodium zeolites may be represented as follows:

$$Na_2O:Al_2O_3:xSiO_2:yH_2O$$

In general, a particular crystalline zeolite will have values for x and y that fall in a definite range. The value x for a particular zeolite will vary somewhat since the aluminum atoms and the silicon atoms occupy essentially equivalent positions in the lattice. Minor variations in the relative numbers of these atoms do not significantly alter the crystal structure of physical properties of the zeolite. For zeolite X, an average value for x is about 2.5 with the x value normally falling within the range $2.5\pm0.5$. For zeolite A, the x value normally falls within the range $1.85+0.5$.

The value of y is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for y determined for zeolite X is 6.2. For zeolite A, it is 5.1.

In zeolites synthesized according to the preferred procedure, the molar ratio $Na_2O/Al_2O_3$ should equal one. But if all the excess sodium present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio for zeolite X lies in the range of

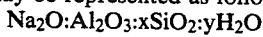

$$Na_2O/Al_2O_3=0.9\pm0.2.$$

The ratio for zeolite A lies in the range of $$Na_2O/Al_2O_3=1.0\pm0.2.$$

Thus, the formula for zeolite A may be written as follows:
$$1.0\pm0.2Na_2O:Al_2O_3:1.85\pm0.5SiO_2:yH_2O$$
The formula for zeolite X may be written as follows:
$$0.9\pm0.2Na_2O:Al_2O_3:2.5\pm0.5SiO_2:yH_2O$$
"y" May be any value up to 6 for zeolite A; any value up to 8 for zeolite X.

The pores of zeolites normally contain water.

The above formulas represent the chemical analysis of zeolites A and X. When other materials as well as water are in the pores, chemical analysis will show a lower value of y and the presence of other adsorbates. The presence in the crystal lattice of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the $K\alpha$ doublet of copper, and a Geiger counter spectrometer with a strip chart pen recorder is used. The peak heights, I, and the positions as a function of $2\theta$ where $\theta$ is the Bragg angle, were read from a spectrometer chart. From these, the relative intensities, $100\ I/I_o$, where $I_o$ is the intensity of the strongest line or peak, and d the interplanar spacing in Å corresponding to the recorded lines were calculated.

X-ray powder diffraction data for sodium zeolite X are given in Table A. $100\ I/I_o$ and the d values in angstroms (Å) for the observed lines for zeolite X are also given. The X-ray patterns indicate a cubic unit cell of dimensions between 24.5 Å and 25.5 Å. In a separate column are listed the sum of the squares of the Miller indices $(h^2+k^2+l^2)$ for a cubic unit cell that corresponds to the observed lines in the x-ray diffraction patterns. The $a_o$ value for zeolite X is 24.99 Å where $a_o$ is the unit cell edge.

Zeolite X is a name given to a synthetic zeolite having the crystal structure of the naturally occurring mineral, faujasite. Zeolite X is the name for those compounds having an $SiO_2/Al_2O_3$ ratio of less than 3.

TABLE A

X-RAY DIFFRACTION PATTERN FOR ZEOLITE X

| $h^2 + k^2 + l^2$ | $\dfrac{100\ I}{I_o}$ | d (Å) |
|---|---|---|
| 3 | 100 | 14.47 |
| 8 | 18 | 8.85 |
| 11 | 12 | 7.54 |
| 19 | 18 | 5.73 |
| 27 | 5 | 4.81 |
| 32 | 9 | 4.42 |
| 35 | 1 | 4.23 |
| 40 | 4 | 3.946 |

TABLE A-continued

X-RAY DIFFRACTION PATTERN FOR ZEOLITE X

| $h^2 + k^2 + l^2$ | $\frac{100\,I}{I_o}$ | d (Å) |
|---|---|---|
| 43 | 21 | 3.808 |
| 44 | 3 | 3.765 |
| 48 | 1 | 3.609 |
| 51 | 1 | 3.500 |
| 56 | 18 | 3.338 |
| 59 | 1 | 3.253 |
| 67 | 4 | 3.051 |
| 72 | 9 | 2.944 |
| 75 | 19 | 2.885 |
| 80 | 8 | 2.794 |
| 83 | 2 | 2.743 |
| 88 | 8 | 2.663 |
| 91 | 3 | 2.620 |
| 96 | 1 | 2.550 |
| 108 | 5 | 2.404 |
| 123 | 1 | 2.254 |
| 128 | 3 | 2.209 |
| 131 | 3 | 2.182 |
| 136 | 2 | 2.141 |
| 139 | 2 | 2.120 |
| 144 | 1 | 2.083 |
| 164 | 1 | 1.952 |
| 168 | 1 | 1.928 |
| 184 | 1 | 1.842 |
| 195 | 1 | 1.789 |
| 200 | 2 | 1.767 |
| 211 | 3 | 1.721 |
| 243 | 3 | 1.603 |

The more significant d values for zeolite X are given in Table B.

TABLE B

MOST SIGNIFICANT d VALUES FOR ZEOLITE X

| d Value of Reflection in Å |
|---|
| 14.42 ± 0.2 |
| 8.82 ± 0.1 |
| 4.41 ± 0.05 |
| 3.80 ± 0.05 |
| 3.33 ± 0.05 |
| 2.88 ± 0.05 |
| 2.79 ± 0.05 |
| 2.66 ± 0.05 |

X-ray powder diffraction data for sodium zeolite A are given in Table C.

TABLE C

X-RAY DIFFRACTION PATTERN FOR ZEOLITE A

| $h^2 + k^2 + l^2$ | d (Å) | $\frac{100\,I}{I_o}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |

TABLE C-continued

X-RAY DIFFRACTION PATTERN FOR ZEOLITE A

| $h^2 + k^2 + l^2$ | d (Å) | $\frac{100\,I}{I_o}$ |
|---|---|---|
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 1.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table D.

TABLE D

MOST SIGNIFICANT d VALUES FOR ZEOLITE A

| d Value of Reflection in Å |
|---|
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently these additional materials can be identified as initial reactants in the synthesis of the zeolite, or as other crystalline substances. When the zeolite is heat treated at temperatures of between 100° C. and 600° C. in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist", Vol. 28, page 545, 1943, permits a quick check of the silicon to aluminum ratio of the zeolite. According to the description of the test, zeolite minerals with a three-dimensional network that contains aluminum and silicon atoms in an atomic ratio of Al/Si=2/3=0.67, or greater, produce a gel when treated with hydrochloric acid. Zeolites having smaller aluminum to silicon ratios disintegrate in the presence of hydrochloric acid and precipitate silica.

U.S. Pat. No. 2,882,243 describes a process for making zeolite A comprising preparing a sodium-aluminum-silicate water mixture having an $SiO_2/Al_2O_3$ mole ratio of from 0.5:1 to 2.5:1, an $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

U.S. Pat. No. 2,882,244 describes a process for making zeolite X comprising preparing a sodium-aluminum-silicate water mixture having an $SiO_2/Al_2O_3$ mole ratio of from 3:1 to 5:1, an $Na_2O/SiO_2$ mole ratio of from 1.2:1 to 1.5:1, and an $H_2O/Na_2O$ mole ratio of from 35:1 to 60:1, maintaining the mixture at a temperature of from 20° C. to 120° C. until zeolite X is formed and separating the zeolite X from the mother liquor.

The process described in U.S. Pat. No. 3,101,251 is similar to that described in U.S. Pat. Nos. 2,882,243 and 2,882,244, except that the reaction mixture contains an admixture of non-kaolinitic alumino-silicate mineral and sodium hydroxide that has been fused at a temperature of between 330° C. and 370° C.

In U.S. Pat. No. 3,119,659, a kaolin clay and sodium hydroxide are formed into a compact body, dried, reacted in an aqueous mixture at a temperature of from 20° C. to 175° C. until a zeolite is formed. Zeolite A is formed in a reaction mixture having an $Na_2O/SiO_2$ molar ratio of 0.5:1 to 1.5:1, an $SiO_2/Al_2O_3$ molar ratio of 1.6:1 to 2.4:1 and an $H_2O/Na_2O$ molar ratio of 20:1 to 100:1. Zeolite X is formed in a reaction mixture having an $Na_2O/SiO_2$ molar ratio of 1.5:1, an $SiO_2/Al_2O_3$ molar ratio of 5:1, and an $H_2O/Na_2O$ molar ratio of 30:1 to 60:1.

U.S. Pat. No. 4,235,856 discloses a process for making a combination of zeolite X and zeolite A wherein a sodium aluminate solution is added to a sodium silicate solution to form a mixture, then heating and reacting the mixture to 80°-120° C. until the combination zeolite is formed.

Another patent which discloses a process for making synthetic zeolite particles having two different sized effective pore entrance diameters within a single particle, namely a particle containing both a Type A zeolite structure and a Type X zeolite structure is U.S. Pat. No. 3,366,578.

U.S. Pat. No. 4,094,778 discloses a process for sequestering calcium and magnesium cations using mixtures of zeolite A and zeolite X.

British Pat. No. 1,533,496 sets forth a process for preparing low silica faujasite-type zeolites by adding potassium hydroxide or a potassium salt to the alumina trihydrate in addition to the sodium hydroxide prior to the addition of the sodium silicate.

U.S. Pat. No. 4,166,099 discloses a method for preparing crystalline aluminosilicates, such as a Type X synthetic faujasite by seeding an alkaline precursor mixture of alumina and silica with small size zeolite seeds having an average particle size below about 0.1 micron.

Zeolites are useful as molecular sieves and as sequestering agents for calcium and magnesium cations. They are particularly useful in detergent or washing compositions.

It is a primary object of the present invention to provide a faster and more economical process for making combination zeolite X and zeolite A particles.

SUMMARY OF THE INVENTION

The present invention relates to a method of simultaneously producing or co-synthesizing a combination of zeolite X and zeolite A. A sodium aluminate solution and a sodium silicate solution are separately prepared. These solutions are then reacted in the presence of a small amount of zeolite X seed under controlled conditions of temperature and time to form a product which is a combination of zeolite X and zeolite A.

DESCRIPTION OF THE PREFERRED EMBODIMENTS

In general, solutions of sodium aluminate and sodium silicate are separately prepared. These solutions are mixed together at a temperature of about 15° C. in the presence of a small amount of seed zeolite. As soon as addition has been completed, the mixture is rapidly heated to a temperature of about 90°-100° C. and held at such temperature for about 45 minutes. The mixture is then cooled to a temperature of about 70°-75° C. and cooked or held at such temperature for about three to four hours. The hot product is transferred to a holding container and subsequently filtered out at a temperature of about 65°-75° C. After washing and drying, a product which is a combination of zeolite X and zeolite A is recovered.

The compositions of the sodium aluminate and the sodium silicate may be varied as desired; however, they should be such as to provide a system having a composition of $(3.0-5.5) Na_2O_2Al_2O_3.(2.5-4.5)SiO_2.(100-120)H_2O$. For example, a sodium aluminate solution comprising 9.55 percent sodium and 4.48 percent aluminum and a sodium silicate solution of water, sodium hydroxide and sodium silicate of 9.85 percent sodium and 11.90 percent silicon have produced excellent yields.

The seed zeolite may be a commercially available zeolite X or a combination of zeolite X and zeolite A or may be product from a previous run of the process of this invention. The latter is sometimes referred to as bulk product. The seed zeolite may be present in an amount of about 0.1 to 10 percent by weight of the total system. Activation of the seed zeolite may be from about one minute to about six hours, and the temperature may be from about 0° C. to about 110° C., with 15° C. being most preferred. Activation may be in the sodium silicate alone, a sodium silicate-sodium hydroxide mixture, or a sodium silicate-sodium hydroxide-water mixture. Activation may thus be separately performed or done in situ.

Preferably, the sodium aluminate solution is added to the sodium silicate solution. Such addition is relatively slow with vigorous stirring. The system is then allowed to gel without stirring at ambient temperature for up to about 24 hours. Gelling time may be as little as 15 minutes. Cooking time may be from about 1 hour to about 12 hours.

Having described the basic aspects of the invention, the following examples illustrate specific embodiments thereof.

General Procedure

All reactions were carried out in a 1-liter, 3-necked, round-bottom flask equipped with a Teflon blade stirrer operated by a variable speed electric stirrer. A thermometer was inserted in one neck of the flask. The sodium aluminate was added via a syringe pump through the final neck which was subsequently equipped with a condenser during heating and cooking periods. The system was cooled with a refrigerated circulating bath and heated with oil bottles on hot plates.

Filtrations were made with medium frit glass filter funnels. The solids were washed by stirring for 1 hour in 500 ml of distilled water. The washed solids were again filtered and the wash water combined with the spent liquor. The solids were dried at 115° C. in an oven set to shut off three hours after the solids were placed in the oven. The solids were removed after the oven had cooled to ambient temperature. Samples were ground with a mortar and pestle prior to Calcium Exchange Capacity (CEC) and Magnesium Exchange Capacity (MEC) measurement.

Reagents were commercially available products or prepared in the laboratory. Sodium silicate solution contained 6.6 percent sodium and 16.2 percent silicon. A typical analysis of sodium aluminate used was 9.7 percent sodium and 5.1 percent aluminum. Zeolite seed was bulk product from previous runs with the initial seed being a commercial zeolite X product, Linde 13X.

The recipe used was 100 g of sodium silicate and 5.7 g of contained seed (average 20 percent moisture). The amounts of sodium aluminate, sodium hydroxide and water were adjusted to provide a final system composition as follows:

4.4Na$_2$O.Al$_2$O$_3$.3.0SiO$_2$.150H$_2$O.

Procedure except as otherwise noted was as follows:

The sodium silicate, sodium hydroxide, seed and water were mixed in the reactor and stirred at 200 rpm for 1 hour (seed activation period).

The 13° C. bath was contacted with the reactor and the stirrer turned up to 600 rpm (cool down period).

After 5 minutes, when the reactor temperature reached 15° C., the sodium aluminate was added. This period ranged from 7 minutes to 95 minutes and is described in Table I (mix period).

The condenser was put in place, the stirrer turned down to 200 rpm and a 110° C. oil bath contacted with the reactor. Heatup period ended when the reaction mass reached 90° C. and the cook period started. Typically, the system reached 102°–103° C. during cook. The heat-up period was typically 22–30 minutes.

For those experiments with a hold period, the stirrer was shut off, and the 110° C. oil bath was replaced with a 73° C. oil bath which maintained the reaction mass at 70° C. for the stated period of time.

The solids were filtered, washed, filtered again and dried. The above procedure is illustrated with the following specific examples.

EXAMPLE 1

100.0 g of sodium silicate, 5.7 g of seed, 10.4 g of NaOH and 232.1 g of water were placed in the reactor. After 1 hour of stirring at 200 rpm, the refrigerated bath was contacted and the stirrer was turned up to 500 rpm. After 5 minutes, 147.6 g of sodium aluminate was added using a 100 ml syringe and a Saya syringe pump model 355 set at 120* 0.1. The addition required 35 minutes. The stirrer was turned back to 200 rpm's, the condenser was put in place, and the 110° C. oil bath contacted. After 26 minutes, the system was at 90° C. After 4 hours, the unit was shut down, the slurry filtered, the solids washed, refiltered and dried (Run 37 of Table I and Table II).

EXAMPLE 2

The same quantities as in Example 1, and in general the same procedures, were used with the following exceptions. The sodium aluminate was added using 2 plastic, 60 ml syringes in series with the pump at 120* 1. This required 15 minutes. The cook period was ¾ hour. The stirrer was then shut off and the 73° C. oil bath was contacted with the system. After 4½ hours, the system was filtered and treated as above (Run 45 of Tables I & II).

The significant results, as well as the times for the various steps, are given in Table I. The average product composition was 1.01 (±0.15) Na$_2$O.Al$_2$O$_3$.2.37(±0.22)SiO$_2$.(4–6)H$_2$O.

The average material utilizations are 99% Al, 70–75% Si and 20–25% Na.

Similar runs were made using various systems. The results are shown in Table III.

TABLE I

| | | | | | | MIXED ZEOLITES X AND A | | | | | | |
|---|---|---|---|---|---|---|---|---|---|---|---|---|
| Run No.[1] | Seed From Run No. | Mix Temp. (°C.) | Mix Time (min) | Gel Time (hr) | Cook Time (hr)[3] | % Zeolite X[2] | % Zeolite A | x/A | Total Crystallinity | CEC | MEC | Product Weight (g) |
| 1 | I | 15 | 95 | 16 | 6 | 45 | 32 | 1.41 | 77 | 314 | 211 | 55.4 |
| 2 | II | 15 | 95 | 16 | 6 | 0 | "Mostly" | — | — | — | — | 74.9 |
| 3 | 1 | 15 | 95 | 16 | 6 | 30 | 30 | 1.00 | 60 | 299 | 185 | 86.6 |
| 4 | 1 | 15 | 90 | 2 | 4 | 52 | 40 | 1.30 | 92 | 279 | 160 | 58.4 |
| 5 | 1 | 15 | 90 | 0 | 4 | 42 | 34 | 1.24 | 76 | 265 | 175 | 65.1 |
| 6 | 1 | 15 | 95 | 0 | 4 | 34 | 42 | 0.81 | 76 | 264 | 141 | 60.6 |
| 7 | 4 | 15 | 50 | 0 | 0 | A | — | — | — | — | — | 109.5 |
| 8 | 4 | 15 | 50 | 0 | 0 | A | — | — | — | — | — | 110.0 |
| 9 | 3 | 15 | 35 | 0 | 0 | A | — | — | — | — | — | 92.7 |
| 10 | I | 15 | 40 | 0 | 0 | A | — | — | — | — | — | 111.8 |
| 11 | I | 15 | 95 | 0 | 0 | A | — | — | — | — | — | 104.2 |
| 12 | I | 15 | 95 | 16 | 6 | 39 | 35 | 1.11 | 74 | 246 | 162 | 57.4 |
| 13 | 12 | 15 | 95 | 0 | 4 | 29 | 34 | 0.54 | 83 | 288 | 138 | 54.8 |
| 14 | 12 | 15 | 35 | 0 | 4 | 40 | 42 | 0.95 | 82 | 278 | 175 | 70.4 |
| 15 | 12 | 15 | 30 | 0 | 0 | A | — | — | — | — | — | 101.2 |
| 16 | 4 | 15 | 35 | 0 | 4 | 43 | 16 | 2.69 | 59 | 170 | 111 | 50.4 |

TABLE I-continued

MIXED ZEOLITES X AND A

| Run No.[1] | Seed From Run No. | Mix Temp. (°C.) | Mix Time (min) | Gel Time (hr) | Cook Time (hr)[3] | % Zeolite X[2] | % Zeolite A | x/A | Total Crystallinity | CEC | MEC | Product Weight (g) |
|---|---|---|---|---|---|---|---|---|---|---|---|---|
| 17 | 4 | 15 | 15 | 0 | 4 | 49 | 32 | 1.53 | 82 | 172 | 127 | 56.4 |
| 18 | 4 | 15 | 15 | 0 | 1 | 35 | 28 | 1.25 | 63 | 171 | 144 | 53.8 |
| 19 | 4 | 15 | 7 | 0 | 1 | 46 | 23 | 2.00 | 69 | 233 | 147 | 54.7 |
| 20 | 4 | 20 | 7 | 0 | 1 | 40 | 17 | 2.34 | 57 | — | — | 52.1 |
| 21 | 4 | 15 | 7 | 0 | 1 | 23 | 0 | — | — | — | — | 46.6 |
| 22 | 4 | 16 | 7 | 0 | ½ | A | — | — | — | — | — | 60.7 |
| 23 | 4 | 15 | 7 | 0 | ½ | A | — | — | — | — | — | 99.9 |
| 24 | 14 | 15 | 17 | 0 | 1 | 21 | 29 | 0.72 | 50 | 216 | 102 | 51.9 |
| 25 | 14 | 15 | 15 | 0 | 1 | 18 | 40 | 0.45 | 58 | 208 | 102 | 50.2 |
| 26 | 14 | 15 | 35 | 0 | 1 | 3 | 27 | 0.11 | 30 | 155 | 72 | 51.7 |
| 27 | 5 | 15 | 35 | 0 | 4 | H | — | — | — | — | — | 74.6 |
| 28 | 5 | 15 | 35 | 0 | 4 | H | — | — | — | — | — | 78.0 |
| 29 | 5 | 15 | 35 | 0 | 4 | H | — | — | — | — | — | 81.8 |
| 30 | 5 | 15 | 35 | 0 | 4 | H | — | — | — | — | — | 79.8 |
| 31 | 5 | 15 | 35 | 0 | 4 | H | — | — | — | — | — | 79.9 |
| 32 | 20 | 15 | 35 | 0 | 4 | H | — | — | — | — | — | 54.5 |
| 33 | 20 | 15 | 35 | 0 | 4 | H | — | — | — | — | — | 54.7 |
| 34 | 1 | 15 | 35 | 0 | 4 | 32 | 38 | 0.84 | 70 | 220 | 110 | 56.5 |
| 35 | 14 | 15 | 35 | 0 | 4 | 27 | 43 | 0.63 | 70 | 209 | 98 | 53.4 |
| 36 | 14 | 15 | 35 | 0 | 4 | 32 | 41 | 0.78 | 73 | 234 | 123 | 56.2 |
| 37 | 14 | 15 | 35 | 0 | 4 | 27 | 45 | 0.60 | 72 | 237 | 117 | 58.8 |
| 38 | 14 | 15 | 35 | 0 | 4 | 31 | 43 | 0.72 | 74 | 234 | 127 | 59.4 |
| 39 | 14 | 15 | 35 | 0 | 4 | 33 | 47 | 0.70 | 80 | 236 | 122 | 57.1 |
| 40 | 5 | 15 | 35 | 0 | 4 | 36[4] | 44 | 0.82 | 80 | 240 | 133 | 58.9 |
| 41 | 14 | 15 | 35 | 01 | 2[5] | 33 | 44 | 0.75 | 77 | 249 | 144 | 57.5 |
| 42 | 36[6] | 15 | 35 | 0 | 2[5] | H | — | — | — | — | — | 59.4 |
| 43 | 36[6] | 15 | 35 | 0 | 2[5] | H | — | — | — | — | — | 59.9 |
| 44 | 12 | 15 | 35 | 0 | 1[7] | 40 | 53 | 0.75 | 93 | 265 | 146 | 60.1 |
| 45 | 12 | 15 | 35 | 0 | ½[9] | 32 | 49 | 0.65 | 81 | 288 | 154 | 60.6 |
| 46 | 12[9] | 15 | 35 | 0 | 2[5] | 26 | 38 | 0.68 | 64 | 237 | 127 | 59.7 |
| 47 | 12[9] | 15 | 35 | 0 | 2[5] | 22 | 50 | 0.44 | 72 | 242 | 113 | 58.8 |
| 48 | Comm. Zeo. Y | 15 | 35 | 0 | 4 | 45 | 33 | 1.36 | 88 | 242 | 125 | 63.4 |

[1] Unless indicated in Table F, the seed is second generation, the seed quantity is 5.7 grams and the seed activity procedure is stir in $N_aOH$ + $H_2O$ + SS for 1 hour. (SS = Sodium Silicate).
[2] All experiments prior to Run No. 14 corrected for change in X standard. A = Amorphous; H = Harmotome.
[3] Approximate 30 minutes heat-up time.
[4] 19% Harmotome.
[5] Held at 70° C. without stirring for an additional 3 hours.
[6] Slurry prepared, never filtered or dried. Run No. 36 was seed for this preparation.
[7] As 7 except held 4 hours.
[8] As in 7 except held 4½ hours.
[9] Slurry prepared, never filtered or dried. Run No. 12 was seed for this preparation.

TABLE II

| Run No. | Seed Generation | Seed Quantity (g) | Seed Activation Procedure |
|---|---|---|---|
| 1 | 0 | | 100 g SS for 3 hrs. |
| 2 | 2nd zeolite X | | 3 hour stir |
| 3 | 1st | | |
| 4 | 1st | | Overnight stir |
| 5 | 1st | | Overnight stir |
| 6 | 1st | | |
| 10 | 0 | | 100 g SS for 3 hrs. |
| 11 | 0 | | 100 g SS for 3 hrs. |
| 12 | 0 | | 100 g SS for 3 hrs. |
| 13 | 1st | | |
| 14 | 1st | | |
| 15 | 1st | | |
| 21 | | 0.6 | |
| 22 | | 0.6 | |
| 25 | | | 5 min. stir |
| 26 | | 1.1 | |
| 40 | | 2.85 | |
| 42 | 3rd | | None |
| 43 | 3rd | | |
| 46 | 3rd | | |
| 47 | 3rd | | None |

TABLE III

| Run No. 1 | System | Mix Temp. (0° C.) | Seed % 13X | Seed % ZB 100 | % X[c] | % A[c] | Total Crystallinity | S/A | CEC | MEC |
|---|---|---|---|---|---|---|---|---|---|---|
| 1. | 3.6 $Na_2O.Al_2O_3.3.0\ SiO_2.150\ H_2O$ | 15 | a | a | 87 | 13 | 100 | 6.69 | 259 | 161 |
| 2. | 3.0 $Na_2O.Al_2O_3.3.0\ SiO_2.100\ H_2O$ | 15 | b | b | 29 | 0 | 29 | — | — | — |
| 3. | 2.8 $Na_2O.Al_2O_3.3.0\ SiO_2.102\ H_2O$ | 15 | 100 | 0 | H | H | — | — | — | — |
| 4. | 2.5 $Na_2O.Al_2O_3.3.0\ SiO_2.91.6\ H_2O$ | 15 | 41 | 59 | 45 | 34 | 79 | 1.32 | 240 | 102 |
| 5. | 2.5 $Na_2O.Al_2O_3.3.0\ SiO_2.91.6\ H_2O$ | 25 | 41 | 59 | 43 H | 43 H | — | — | — | — |
| 6. | 2.3 $Na_2O.Al_2O_3.3.0\ SiO_2.91.6\ H_2O$ | 15 | 41 | 59 | A | A | — | — | — | — |

TABLE III-continued

| Run No. | System | Mix Temp. (0° C.) | Seed % 13X | Seed % ZB 100 | % X[c] | % A[c] | Total Crystallinity | S/A | CEC | MEC |
|---|---|---|---|---|---|---|---|---|---|---|
| 7. | 2.5 Na$_2$O.Al$_2$O$_3$.3.0 SiO$_2$.91.6 H$_2$O | 15 | 41 | 59 | 44 | 32 | 77 | 1.38 | 240 | 128 |

[a]Previous bulk product from Run 12 of Table E.
[b]Previous bulk product from Run 48 of Table E.
[c]H = Harmotome; A = Armorphous
Note:
All used concentrated sodium aluminate, Al ~ Na ~ 13% Concentrated sodium silicate (Si ~ 13%, Na ~ 9%) was used in Runs 6 and 7. Cook time was ¾ hour and hold time was 4½ hours at 70° C. Runs No. 4–7 had ~ 18% solids in slurry.

Not wishing to be bound by any particular theory, it is believed that there is a competition between seed induced growth of zeolite X and self-nucleation of zeolite A. If the temperature is lowered, the growth of zeolite X is favored at the expense of zeolite A and, conversely, if the temperature is increased, one rapidly enters a region where zeolite X will not grow on the seed.

The primary product upon completion of mixing is amorphous material, that is, the nuclei which may be crystalline consists of crystals too small to give an X-ray diffraction response. During the heat-up, cook and hold periods, material is transferred from the amorphous phase to the crystalline phases. This process is slow and requires at least ¾ hour at cook temperature to insure a crystalline product. Considerably more time is required to make acceptable CEC and MEC product.

After a sufficient cook period to insure a crystalline product, the remainder of the time requirement is met with unstirred hold at 70° C.

Runs 1 through 21 demonstrate that a gel time is not necessary for the process. There appears to be a requirement for a cook period of about ¾ hours.

Seed through the third generation was successfully used. Seed activation by contact with fresh sodium silicate for a period of time is required when using dry seed.

Mixing temperature is very important. Acceptable crystallinities can be achieved at higher mixing temperatures, but the magnesium exchange capacity suffers.

Reducing the cycle time decreases CEC and MEC.

Both CEC and MEC can be related to the sum of the mix, heat-up, cook and hold times (T) at the 99% statistical confidence levels by the following equations:

$$CEC(\pm 9) = 0.233 * T(min) + 170.3$$

and $$MEC(\pm 13) = 0.143 * T(min) + 95.0.$$

Coulter counter product size distribution for Run No. 3 is given as follows:

| Size μ | % Greater Than |
|---|---|
| 1.0 | 100 |
| 1.3 | 100 |
| 1.6 | 92 |
| 2.0 | 76 |
| 2.6 | 60 |
| 3.2 | 49 |
| 4.0 | 42 |
| 5.1 | 37 |
| 6.3 | 32 |
| 8.0 | 27 |
| 10.0 | 20 |
| 12.8 | 14 |
| 16.0 | 7 |
| 20.0 | 2 |
| 25.0 | 0.5 |
| 32.0 | 0.0 |

The mean size is 2.5μ.

The foregoing disclosure and description of the invention are illustrative and explanatory thereof, and various changes in the illustrated process may be made within the scope of the appended claims without departing from the spirit of the invention.

What is claimed is:

1. A method of co-synthesizing zeolite A and zeolite X, comprising mixing a sodium aluminate solution with a sodium silicate solution in the presence of a seed amount of zeolite X, chilling the solution to about −5° C.-25° C., then heating the mixture to about 90° C.-110° C. to form a product which is a combination of zeolite A and zeolite X.

2. The method of claim 1, wherein chilling is carried out to about 15° C.

3. The method of claim 1, wherein the product of claim 1 has a calcium exchange capacity greater than 240 mg calcium carbonate per gram of zeolite and a magnesium carbonate exchange capacity greater than 120 mg equivalent calcium carbonate per gram of zeolite.

4. A method for producing a combination of zeolite A and zeolite X by the reaction of sodium aluminate and sodium silicate characterized by the following steps:
   (a) forming an aqueous solution of sodium aluminate;
   (b) forming an aqueous solution of sodium silicate;
   (c) mixing said sodium aluminate and said sodium silicate solutions in the presence of a seed amount of zeolite X and chilling to a temperature of −5° C. to 25° C. to produce a reaction mixture comprising a sodium silicate mother liquor and an amorphous sodium alumina silicate;
   (d) heating said mixed sodium aluminate and sodium silicate at a temperature of about 90° C.-110° C., the reaction mixture having the following molar ratios of components:
      (i) water to sodium oxide-36.6:1 to 34.1:1,
      (ii) sodium oxide to silica-0.9:1 to 1.5:1,
      (iii) silica to alumina-2.8:1 to 3.0:1;
   (e) heating and continuing the reaction at these molar ratios until a combination of zeolite A and zeolite X is formed while controlling the molar ratios and reaction time to produce a fine particle size combination zeolite A and zeolite X having an average particle size of less than 2 microns in diameter; and
   (f) recovering the combination zeolite A and zeolite X.

5. The method of claim 4, wherein the amount of zeolite X seed is from about 1.0 to about 10.0 percent by weight of the total system.

6. The method of claim 4, wherein the amount of zeolite X seed is from about five to about seven weight percent of the total system.

7. The method of claim 4, wherein an activated system is created by mixing zeolite X seed with sodium silicate for about ten minutes to about six hours.

8. The method of claim 4, wherein an activated system is created by mixing zeolite X seed with sodium silicate for at least about 30 minutes.

9. The method of claim 4, wherein an activated system is created by mixing zeolite X seed with sodium silicate for about one hour to about three hours.

10. The method of claim 4, wherein after heating the combination zeolite A and zeolite X is filtered, washed and dried and then recovered.

11. The method of claim 4, wherein the silica to sodium oxide ratio of the sodium silicate is less than 3.2.

12. A method of producing a combination of zeolite X and zeolite A, comprising the steps of:
 (a) forming a sodium aluminate solution;
 (b) forming a sodium silicate solution, comprising sodium silicate, sodium hydroxide and water;
 (c) adding a seed amount of zeolite X to the sodium silicate solution and then stirring for a sufficient period of time up to about six hours to activate the zeolite seed at a temperature from about −5° C. to about 25° C.;
 (d) adding the sodium aluminate solution to the sodium silicate solution to produce a reaction mixture of sodium silicate mother liquor, zeolite seed and an amorphous sodium alumino silicate having in total the following molar ratios:
  (i) sodium oxide to silica-0.9:1 to 1.5:1,
  (ii) silica to alumina-2.8:1 to 3.0:1,
  (iii) water to sodium oxide-36.6:1 to 34.1:1;
 (e) reacting the mixture at a temperature of about 90° C. to about 110° C.; and
 (f) recovering the combination of zeolite X and zeolite A.

13. The method of claim 12, wherein the sodium silicate solution has a silica to sodium oxide molar ratio of about 2.8:1.

14. The method of claim 12, wherein the mixture is reacted at a temperature of about 90° C.

15. The method of claim 12, wherein the cooling of step (c) is performed at a temperature of about 15° C.

16. The method of claim 12, wherein the stirring in step (c) is conducted for a period of about one to three hours.

17. The method of claim 12, wherein the stirring of step (c) is conducted for at least about 30 minutes.

18. The method of claim 12, wherein the stirring of step (c) is conducted for at least about ten minutes.

19. The method of claim 12, wherein the stirring of step (c) is conducted from about 200 rpm to about 600 rpm.

20. The method of claim 12, wherein the amount of zeolite seed added in step (c) is from about five to about seven weight percent of the total system.

21. The method of claim 12, wherein the amount of zeolite X seed added in step (c) is from about 1.0 to about 10.0 percent of the total system.

22. The method of claim 12, wherein the water to sodium oxide molar ratio in step (d) is 36.6:1.

23. The method of claim 12, wherein the sodium silicate solution is formed by dissolving sand in a sodium hydroxide solution at sufficient pressure and temperature to produce a sodium silicate solution having a silica to sodium oxide molar ratio of between 2.4:1 and 2.8:1 and then activated with about 500 ppm alumina at ambient temperature.

24. The method of claim 12, wherein an activated system is created by mixing zeolite X seed with the sodium silicate having a silica to sodium oxide ratio less 3.2.

* * * * *